United States Patent
Roychowdhury et al.

(10) Patent No.: US 10,814,429 B2
(45) Date of Patent: Oct. 27, 2020

(54) SYSTEMS AND METHODS FOR DYNAMIC SHAPING OF LASER BEAM PROFILES FOR CONTROL OF MICRO-STRUCTURES IN ADDITIVELY MANUFACTURED METALS

(71) Applicant: General Electric Company, Schenectady, NY (US)

(72) Inventors: Subhrajit Roychowdhury, Schenectady, NY (US); Matthias Hoebel, Windisch (CH); Lang Yuan, Niskayuna, NY (US); Prabhjot Singh, Rexford, NY (US); Michael Evans Graham, Slingerlands, NY (US); Robert John Filkins, Niskayuna, NY (US); Thomas Etter, Aargau (CH); Felix Martin Gerhard Roerig, Baden (CH)

(73) Assignee: General Electric Company, Schenectady, NY (US)

( * ) Notice: Subject to any disclaimer, the term of this patent is extended or adjusted under 35 U.S.C. 154(b) by 343 days.

(21) Appl. No.: 15/881,147

(22) Filed: Jan. 26, 2018

(65) Prior Publication Data
US 2019/0232428 A1  Aug. 1, 2019

(51) Int. Cl.
*B23K 26/342* (2014.01)
*B23K 26/02* (2014.01)
(Continued)

(52) U.S. Cl.
CPC ............ *B23K 26/342* (2015.10); *B23K 26/02* (2013.01); *B23K 26/064* (2015.10);
(Continued)

(58) Field of Classification Search
CPC .. B23K 26/342; B23K 26/064; B23K 26/082; B23K 26/02; B23K 26/0626;
(Continued)

(56) References Cited

U.S. PATENT DOCUMENTS

| 5,155,324 | A | 10/1992 | Deckard et al. | |
|---|---|---|---|---|
| 8,847,113 | B2 * | 9/2014 | Unrath | B23K 26/064 |
| | | | | 219/121.73 |

(Continued)

FOREIGN PATENT DOCUMENTS

| EP | 2893994 A1 | 7/2015 |
|---|---|---|
| GB | 2453945 A | 4/2009 |

(Continued)

OTHER PUBLICATIONS

Gockel et al., "Understanding Ti-6Al-4V Microstructure Control in Additive Manufacturing via Process Maps", Carnegie Mellon University, pp. 666-674, 2013.
(Continued)

*Primary Examiner* — Frederick C Nicolas
(74) *Attorney, Agent, or Firm* — Armstrong Teasdale LLP

(57) ABSTRACT

An additive manufacturing system includes a laser device, a build plate, and a scanning device. The laser device is configured to generate a laser beam with a variable intensity. The build plate is configured to support a powdered build material. The scanning device is configured to selectively direct the laser beam across the powdered build material to generate a melt pool on the build plate. The scanning device is configured to oscillate a spatial position of the laser beam while the laser device is configured to simultaneously modulate the intensity of the laser beam to thermally control the melt pool.

13 Claims, 4 Drawing Sheets

(51) Int. Cl.
*B23K 26/06* (2014.01)
*B23K 26/064* (2014.01)
*B23K 26/08* (2014.01)
*B23K 26/082* (2014.01)
*B33Y 50/02* (2015.01)
*B33Y 10/00* (2015.01)
*B33Y 30/00* (2015.01)
*B22F 3/105* (2006.01)

(52) U.S. Cl.
CPC ........ *B23K 26/0626* (2013.01); *B23K 26/082* (2015.10); *B23K 26/0876* (2013.01); *B22F 3/1055* (2013.01); *B22F 2003/1056* (2013.01); *B33Y 10/00* (2014.12); *B33Y 30/00* (2014.12); *B33Y 50/02* (2014.12)

(58) Field of Classification Search
CPC .... B23K 26/0876; B33Y 10/00; B33Y 30/00; B33Y 50/02; B22F 2003/1056; B22F 3/1055
See application file for complete search history.

(56) References Cited

U.S. PATENT DOCUMENTS

| | | |
|---|---|---|
| 9,522,426 B2 | 12/2016 | Das et al. |
| 9,561,622 B2 | 2/2017 | Das et al. |
| 9,925,715 B2 | 3/2018 | Cheverton et al. |
| 2015/0090074 A1 | 4/2015 | Etter et al. |
| 2015/0165556 A1 | 6/2015 | Jones et al. |
| 2015/0198052 A1 | 7/2015 | Pavlov et al. |
| 2015/0375456 A1 | 12/2015 | Cheverton et al. |
| 2016/0158889 A1 | 6/2016 | Carter et al. |
| 2016/0200084 A1 | 7/2016 | Hays et al. |
| 2016/0326880 A1 | 11/2016 | Slavens et al. |
| 2017/0102689 A1 | 4/2017 | Khajepour et al. |
| 2017/0144370 A1 | 5/2017 | Moore et al. |
| 2017/0144371 A1 | 5/2017 | Lussier et al. |
| 2017/0165789 A1 | 6/2017 | Demos |
| 2017/0197278 A1 | 7/2017 | Garry et al. |
| 2017/0320168 A1 | 11/2017 | Martinsen |

FOREIGN PATENT DOCUMENTS

| | | |
|---|---|---|
| KR | 101697530 B1 | 1/2017 |
| WO | 2017015241 A1 | 1/2017 |
| WO | 2017075423 A1 | 5/2017 |

OTHER PUBLICATIONS

Huang et al., "Microstructure-Controllable Laser Additive Manufacturing Process for Metal Products", Physics Procedia, vol. 56, pp. 58-63, 2014.

Gockel, "Integrated Control of Solidification Microstructure and Melt Pool Dimensions in Additive Manufacturing of Ti-6Al-4V", Carnegie Mellon University, 2014.

U.S. Appl. No. 15/615,163, filed Jun. 6, 2017, entitled Systems and Methods for Fabricating a Component With a Simulated Laser Array.

U.S. Appl. No. 15/401,643, filed Jan. 9, 2017, entitled System and Methods for Fabricating a Component With Laser Array.

Matilainen et al., "Characterization of Process Efficiency Improvement in Laser Additive Manufacturing", Physics Procedia, vol. 56, pp. 317-326, 2014.

International Search Report and Written Opinion, dated Apr. 19, 2019, for related International application No. PCT/US2018/067806 (12 pgs.).

* cited by examiner

SYSTEMS AND METHODS FOR DYNAMIC SHAPING OF LASER BEAM PROFILES FOR CONTROL OF MICRO-STRUCTURES IN ADDITIVELY MANUFACTURED METALS

BACKGROUND

The field of the disclosure relates generally to additive manufacturing systems, and more particularly, to systems and methods for dynamically shaping laser beam profiles used in additive manufacturing systems to control microstructures in additively manufactured metals.

At least some additive manufacturing systems involve the consolidation of a powdered material to make a component. This method can produce complex components from expensive materials at a reduced cost and with improved manufacturing efficiency. At least some known additive manufacturing systems, such as Direct Metal Laser Melting (DMLM) systems, fabricate components using a laser device, a build plate, and a powdered material, such as, without limitation, a powdered metal. The laser device generates a laser beam that melts the powdered material on the build plate in and around the area where the laser beam is incident on the powdered material, resulting in a melt pool. The melt pool then solidifies to form an additively manufactured component. However, if the melt pool cools too quickly, thermal contraction of the metal material may lead to cracking of the component, reducing component quality.

BRIEF DESCRIPTION

In one aspect, an additive manufacturing system is provided. The additive manufacturing system includes a laser device, a build plate, and a scanning device. The laser device is configured to generate a laser beam with a variable intensity. The build plate is configured to support a powdered build material. The scanning device is configured to selectively direct the laser beam across the powdered build material to generate a melt pool on the build plate. The scanning device is configured to oscillate a spatial position of the laser beam while the laser device is configured to simultaneously modulate the intensity of the laser beam to thermally control the melt pool.

In another aspect, a method of manufacturing a component using in an additive manufacturing system including a laser device, a build plate, and a scanning device is provided. The method includes generating a laser beam with a variable intensity using the laser device. The method also includes selectively directing the laser beam across the build plate to generate a melt pool on the build plate. The method further includes oscillating a position of the laser beam on the melt pool while simultaneously modulating the intensity of the laser beam to thermally control the melt pool.

In yet another aspect, an additive manufacturing system is provided. The additive manufacturing system includes a laser device, a build plate, and a scanning device. The laser device is configured to generate a laser beam with a variable intensity. The build plate is configured to support a powdered build material. The scanning device is configured to selectively direct the laser beam across the powdered build material to generate a melt pool on the build plate. The scanning device is configured to oscillate a spatial position of the laser beam while the laser device simultaneously modulates the intensity of the laser beam.

In a further aspect, an additive manufacturing system is provided. The additive manufacturing system includes an energy device, a build plate, and a scanning device. The energy device is configured to generate an energy beam with a variable intensity. The build plate is configured to support a powdered build material. The a scanning device is configured to selectively direct the energy beam across the build material to fix the build material on the build plate. The scanning device is configured to oscillate a spatial position of the energy beam while the energy device simultaneously modulates the intensity of the energy beam to facilitate reducing spatter and to facilitate reducing a temperature of the build material to reduce overheating of the build material.

DRAWINGS

These and other features, aspects, and advantages of the present disclosure will become better understood when the following detailed description is read with reference to the accompanying drawings in which like characters represent like parts throughout the drawings, wherein.

Figure 1:
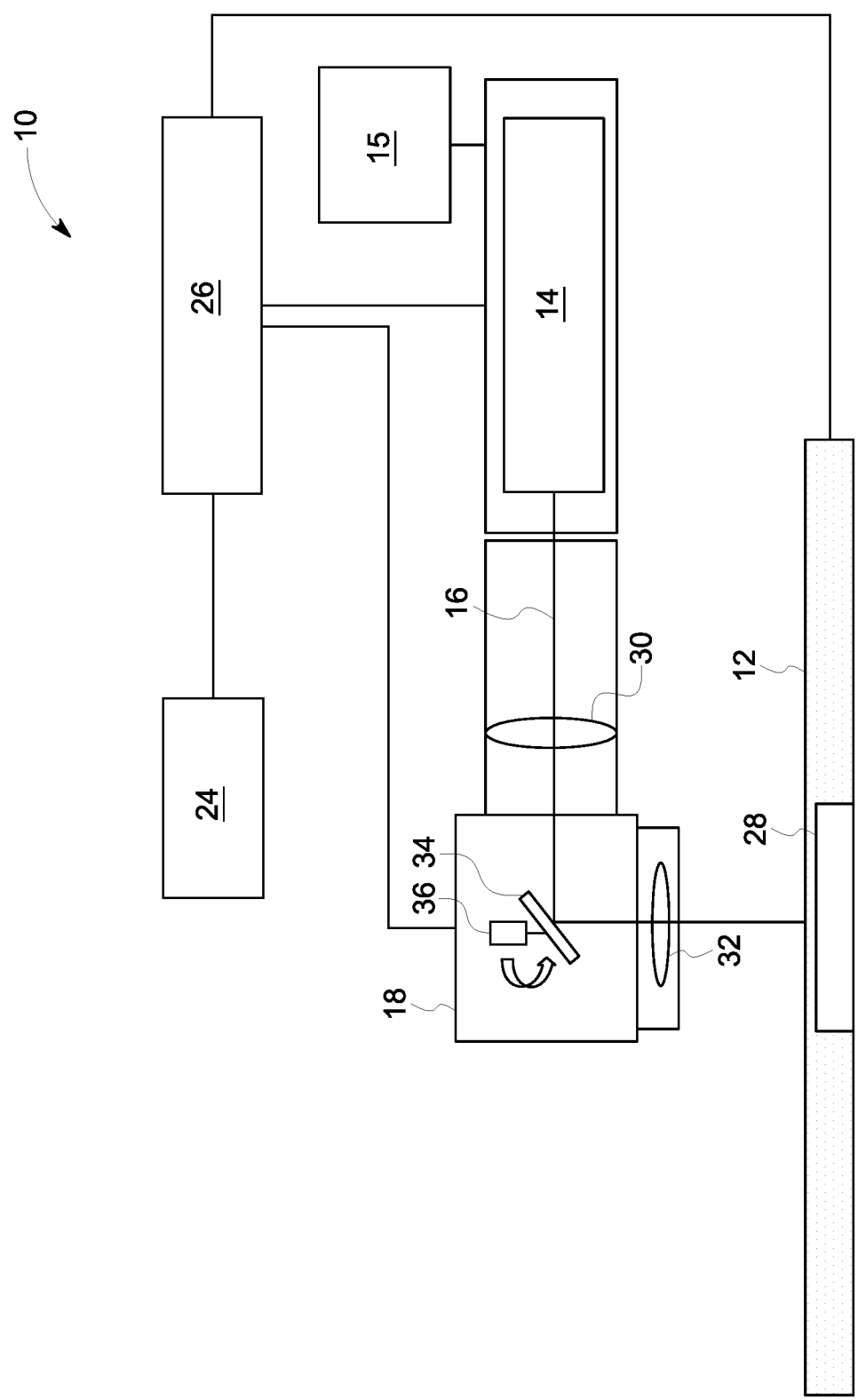
FIG. 1 is a schematic view of an exemplary additive manufacturing system shown in the form of a direct metal laser melting (DMLM) system.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable nonvolatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

Additive manufacturing processes and systems include, for example, and without limitation, vat photopolymerization, powder bed fusion, binder jetting, material jetting, sheet lamination, material extrusion, directed energy deposition and hybrid systems. These processes and systems include, for example, and without limitation, SLA—Stereolithography Apparatus, DLP—Digital Light Processing, 3SP—Scan, Spin, and Selectively Photocure, CLIP—Continuous Liquid Interface Production, SLS—Selective Laser Sintering, DMLS—Direct Metal Laser Sintering, SLM—Selective Laser Melting, EBM—Electron Beam Melting, SHS—Selective Heat Sintering, MJF—Multi-Jet Fusion, 3D Printing, Voxeljet, Polyjet, SCP—Smooth Curvatures Printing, MJM—Multi-Jet Modeling Projet, LOM—Laminated Object Manufacture, SDL—Selective Deposition Lamination, UAM—Ultrasonic Additive Manufacturing, FFF—Fused Filament Fabrication, FDM—Fused Deposition Modeling, LMD—Laser Metal Deposition, LENS—Laser Engineered Net Shaping, DMD—Direct Metal Deposition, Hybrid Systems, and combinations of these processes and systems. These processes and systems may employ, for example, and without limitation, all forms of electromagnetic radiation, heating, sintering, melting, curing, binding, consolidating, pressing, embedding, and combinations thereof.

Additive manufacturing processes and systems employ materials including, for example, and without limitation, polymers, plastics, metals, ceramics, sand, glass, waxes, fibers, biological matter, composites, and hybrids of these materials. These materials may be used in these processes and systems in a variety of forms as appropriate for a given material and the process or system, including, for example, and without limitation, as liquids, solids, powders, sheets, foils, tapes, filaments, pellets, liquids, slurries, wires, atomized, pastes, and combinations of these forms.

Embodiments of additive manufacturing systems with dynamically shaped laser beam profiles to control microstructures in additively manufactured metals are described herein. The additive manufacturing system includes a laser device, a build plate, a power supply system, and a scanning device. The build plate has a powered build material and the laser device and the scanning device direct a laser across the powered build material to create a melt pool. The power supply system supplies a variable level of power to the laser device which varies the intensity level of the laser beam. Exemplary powdered build materials have extremely high cooling rates. As such, these powdered build materials solidify extremely quickly once the laser beam moves away from the material. Quick solidification leads to extreme thermal contraction of the metal material which may lead to cracking of the component and reduced component quality. The laser beam is spatially oscillated to control or reduce the cooling rate of the powdered build material and reduce the solidification time of the material. Additionally, the power level delivered to the laser device is also modulate along with spatial oscillation such that the cooling rate of the powered build material is controlled or reduced. Spatial oscillation and power modulation allows the laser beam to slow down solidification of the melt pool, reducing the risk of cracking of the component and increasing material quality.

FIG. 1 is a schematic view of an exemplary additive manufacturing system 10 illustrated in the form of a direct metal laser melting (DMLM) system. Although the embodiments herein are described with reference to a DMLM system, this disclosure may also apply to other types of additive manufacturing systems, such as selective laser sintering systems or selective electron beam melting (SEBM) systems.

In the exemplary embodiment, DMLM system 10 includes a build plate 12, a laser device 14 configured to generate a laser beam 16, a first scanning device 18 configured to selectively direct laser beam 16 across build plate 12, and, optionally, a power supply system 15 configured to supply power to laser device 14. The exemplary DMLM system 10 also includes a computing device 24 and a controller 26 configured to control one or more components of DMLM system 10, as described in more detail herein.

Build plate 12 includes a powdered build material that is melted and re-solidified during the additive manufacturing process to build a solid component 28. The powdered build material includes materials suitable for forming such components, including, without limitation, gas atomized alloys of cobalt, iron, aluminum, titanium, nickel, and combinations thereof. In other embodiments, the powdered build material may include any suitable type of powdered metal material. In yet other embodiments, the powdered build material may include any suitable build material that enables DMLM system 10 to function as described, including, for example and without limitation, ceramic powders, metal-coated ceramic powders, and thermoset or thermoplastic resins.

Laser device 14 is configured to generate a laser beam 16 of sufficient energy to at least partially melt the build material of build plate 12. In the exemplary embodiment, laser device 14 is a yttrium-based solid state laser configured to emit a laser beam having a wavelength of about 1070 nanometers (nm). In other embodiments, laser device 14 may include any suitable type of laser that enables DMLM system 10 to function as described herein, such as a fiber laser configured to emit a laser beam having a wavelength in the range of about 1030 nm to of about 1080 nm, a disk laser configured to emit a laser beam having a wavelength of about 1030 nm, a diode laser, or a $CO_2$ laser. Further, although DMLM system 10 is shown and described as including a single laser device 14, DMLM system 10 may include more than one laser device. In one embodiment, for example, DMLM system 10 may include a first laser device having a first power and a second laser device having a second power different from the first laser power, or at least two laser devices having substantially the same power output. In yet other embodiments, DMLM system 10 may include any combination of laser devices that enable DMLM system 10 to function as described herein.

Power supply system 15 is configured to supply a variable level of power to laser device 14. In the exemplary embodiment, power supply system 15 includes a transformer electrically coupled to a conventional electrical grid configured to vary the voltage sent to laser device 14. Power supply system 15 may also include a battery and a transformer as a source of electrical power. Power supply system 15 may include any power supply system that is capable of providing a varying level of power.

As shown in FIG. 1, laser device 14 is optically coupled to optical elements 30 and 32 that facilitate focusing laser beam 16 on build plate 12. In the exemplary embodiment, optical elements 30 and 32 include a beam collimator 30 disposed between the laser device 14 and first scanning device 18, and an F-theta lens 32 disposed between the first scanning device 18 and build plate 12. In other embodiments, DMLM system 10 may include any suitable type and arrangement of optical elements that provide a collimated and/or focused laser beam on build plate 12.

First scanning device 18 is configured to direct laser beam 16 across selective portions of build plate 12 to create solid component 28. In the exemplary embodiment, first scanning device 18 is a galvanometer scanning device including a mirror 34 operatively coupled to a galvanometer-controlled motor 36 (broadly, an actuator). Motor 36 is configured to move (specifically, rotate) mirror 34 in response to signals received from controller 26, and thereby deflect laser beam 16 across selective portions of build plate 12. Mirror 34 may have any suitable configuration that enables mirror 34 to deflect laser beam 16 towards build plate 12. In some embodiments, mirror 34 may include a reflective coating that has a reflectance spectrum that corresponds to the wavelength of laser beam 16.

Although first scanning device 18 is illustrated with a single mirror 34 and a single motor 36, first scanning device 18 may include any suitable number of mirrors and motors that enable first scanning device 18 to function as described herein. In one embodiment, for example, first scanning device 18 includes two mirrors and two galvanometer-controlled motors, each operatively coupled to one of the mirrors. In yet other embodiments, first scanning device 18 may include any suitable scanning device that enables DMLM system 10 to function as described herein, such as, for example, two-dimension (2D) scan galvanometers, three-dimension (3D) scan galvanometers, piezo mirrors, and dynamic focusing galvanometers.

Computing device 24 may be a computer system that includes at least one processor (not shown in FIG. 1) that executes executable instructions to operate DMLM system 10. Computing device 24 may include, for example, a calibration model of DMLM system 10 and an electronic computer build file associated with a component, such as component 28. The calibration model may include, without limitation, an expected or desired melt pool size and temperature under a given set of operating conditions (e.g., a power of laser device 14) of DMLM system 10. The build file may include build parameters that are used to control one or more components of DMLM system 10. Build parameters may include, without limitation, a power of laser device 14, a scan speed of first scanning device 18, and a position and orientation of first scanning device 18 (specifically, mirror 34). In the exemplary embodiment, computing device 24 and controller 26 are shown as separate devices. In other embodiments, computing device 24 and controller 26 may be combined as a single device that operates as both computing device 24 and controller 26 as each are described herein.

Controller 26 may include any suitable type of controller that enables DMLM system 10 to function as described herein. In one embodiment, for example, controller 26 is a computer system that includes at least one processor and at least one memory device that executes executable instructions to control the operation of DMLM system 10 based at least partially on instructions from human operators. Controller 26 may include, for example, a 3D model of component 28 to be fabricated by DMLM system 10. Executable instructions executed by controller 26 may include controlling the power output of laser device 14 and controlling a position and scan speed of first scanning device 18.

Controller 26 is configured to control one or more components of DMLM system 10 based on build parameters associated with a build file stored, for example, within computing device 24. In the exemplary embodiment, controller 26 is configured to control first scanning device 18 based on a build file associated with a component to be fabricated with DMLM system 10. More specifically, controller 26 is configured to control the position, movement, and scan speed of mirror 34 using motor 36 based upon a predetermined path defined by a build file associated with component 28.

Controller 26 may also be configured to control other components of DMLM system 10, including, without limitation, laser device 14. In one embodiment, for example, controller 26 controls the power output of laser device 14 based on build parameters associated with a build file.

Figure 2:
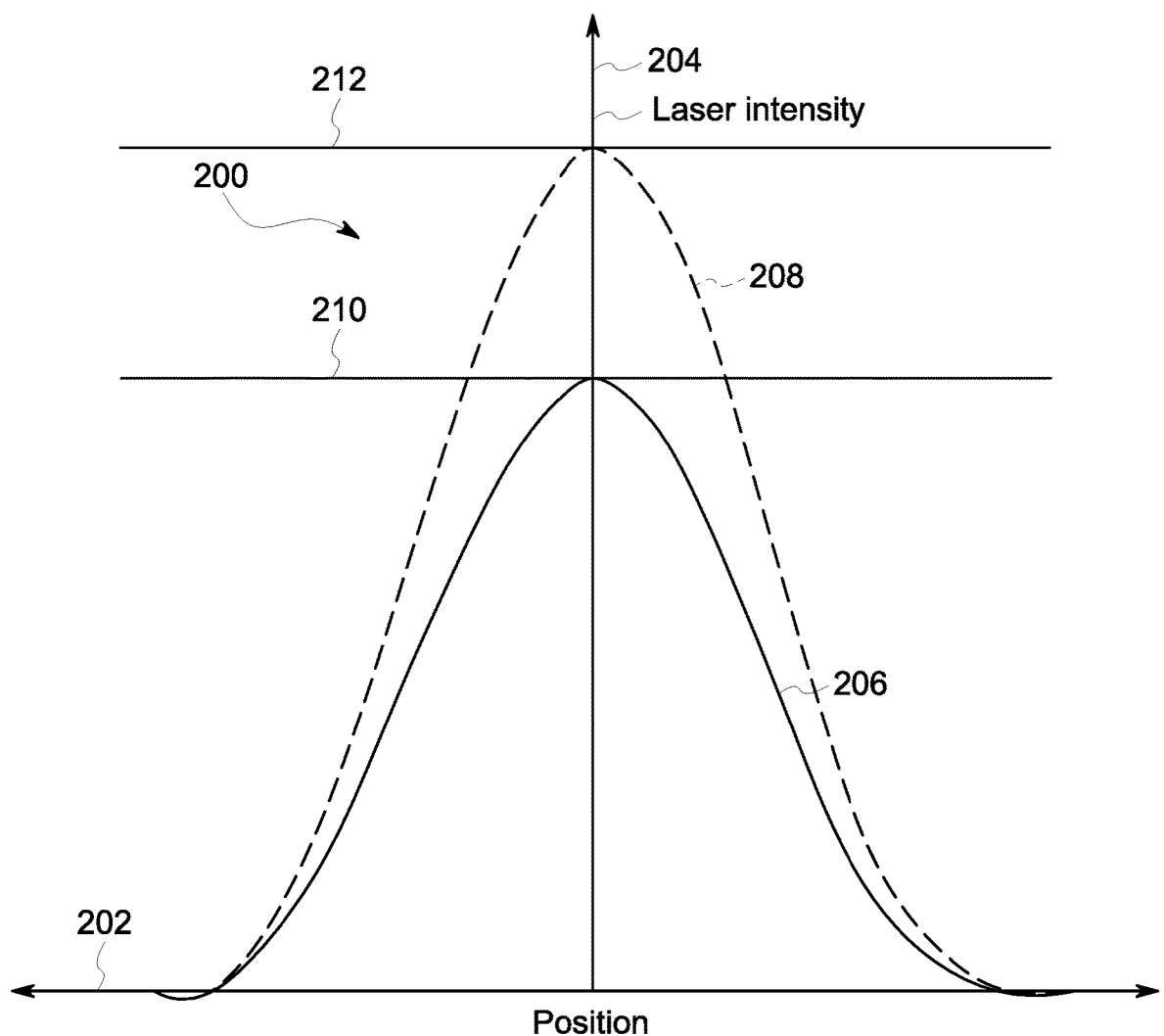
FIG. 2 is a diagram of an intensity of a laser beam used in the DMLM system shown in FIG. 1 relative to a position of the laser beam.

FIG. 2 is a diagram 200 of an intensity of laser beam 16 relative to a position of laser beam 16. As previously discussed, power supply system 15 is configured to deliver a varying level of electric power to laser device 14 in order to vary the intensity of laser beam 16. The x-axis or a first axis 202 represents the position of laser beam 16. The zero coordinate on first axis 202 represents the center of laser beam 16 and coordinates extending away from the zero coordinate represent distances further away from the center of laser beam 16. The y-axis or a second axis 204 represents the intensity of laser beam 16. The zero coordinate on second axis 204 represents zero intensity or laser device 14 turned off and coordinates extending away from the zero coordinate represent higher intensities of laser beam 16.

FIG. 2 depicts a first intensity curve 206 and a second intensity curve 208. Both first intensity curve 206 and second intensity curve 208 include a bell curve shape with the highest intensity at the center of laser beam 16 and lower intensities at distances extending out from the center of laser beam 16. Power supply system 15 provides power to laser device 14 at a first power level representing first intensity curve 206 and provides power to laser device 14 at a second power level representing second intensity curve 208. The first power level is generally lower than the second power level and, as such, second intensity curve 208 generally includes a higher level of intensity than first intensity curve 206. First intensity curve 206 includes a first maximum intensity 210 and second intensity curve 208 includes a second maximum intensity 212.

Figure 3:
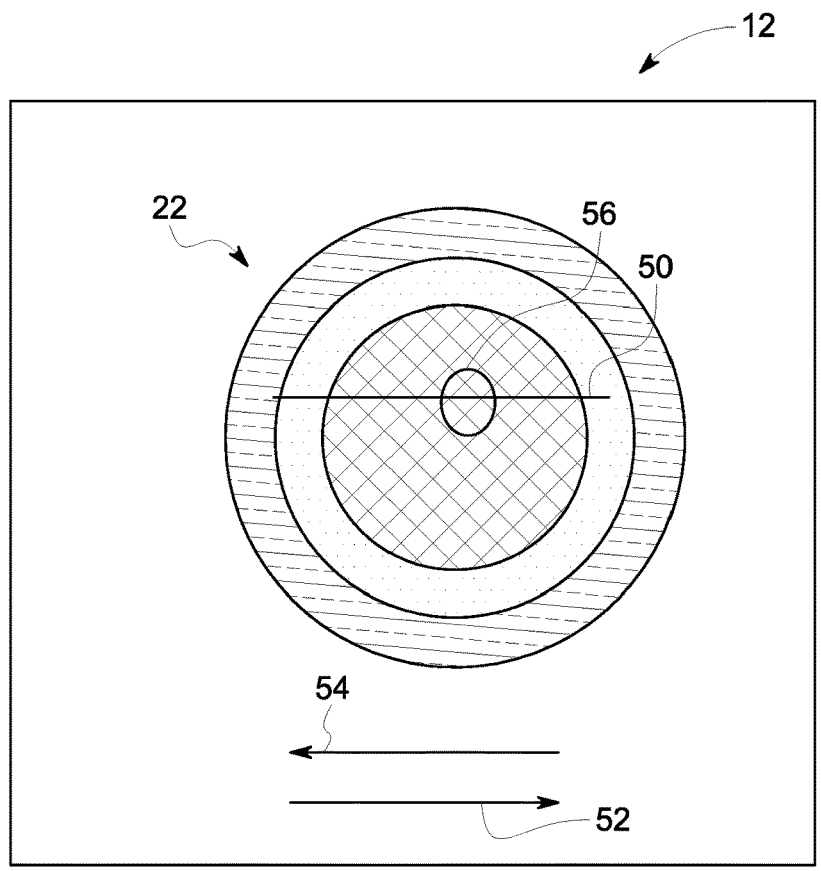
FIG. 3 is a schematic view of a build plate used in the DMLM system shown in FIG. 1.

FIG. 3 is a schematic view of build plate 12 of DMLM system 10. In the exemplary embodiment, build plate 12 has a rectangular shape. In other embodiments, build plate 12 may have any suitable size and shape that enables DMLM system 10 to function as described herein. A melt pool 22 is generated by melting powered build material on build plate 12. Laser beam 16 is directed over melt pool 22 along a nominal laser beam path 50 in a first direction 52. During spatial oscillation, laser beam 16 is directed over melt pool 22 in first direction 52 and a second direction 54 opposite first direction 52. During operation, laser beam 16 is directed across melt pool 22 in first direction 52 while spatial oscillation controls or reduces the cooling rate of melt pool 22 to be below a predetermined threshold.

Figure 4:
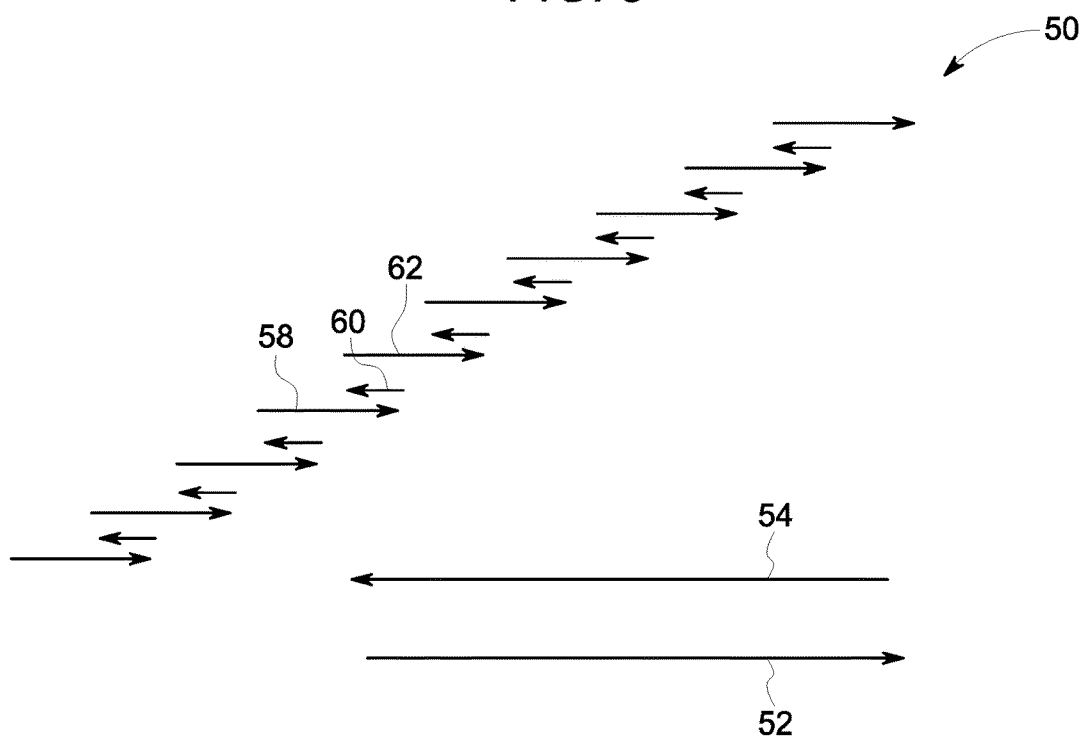
FIG. 4 is a schematic view of a section of a nominal laser beam path on the build plate shown in FIG. 3.

FIG. 4 is a schematic view of a section 56 of nominal laser beam path 50 on build plate 12. As shown, spatial oscillation includes oscillating the position of laser beam 16 in first direction 52 and second direction 54. That is, as laser beam 16 is directed across melt pool 22 in nominal laser beam path 50, it is also periodically directed in second direction 54 and first direction 52. For instance, laser beam 16 is first directed in a direction 58 substantially parallel to first direction 52. Then laser beam 16 is directed in a direction 60 substantially parallel to second direction 54. Laser beam 16 is then directed in a direction 62 substantially parallel to first direction 52. Additionally, laser beam 16 may be directed in a transverse direction (not shown) that is substantially perpendicular to first direction 52 and second direction 54. Laser beam 16 may be directed outside of melt pool 22 to reduce temperature gradients in melt pool 22. Note that while directions 58, 60, and 62 are shown as offset from one another, this is for viewing convenience only. Directions 58, 60, and 62 are in the same plane such that the path of laser beam 16 in direction 58 substantially overlaps the path of laser beam 16 in direction 60 and direction 62. By directing laser beam 16 in second direction 54, laser beam 16 returns to portions of melt pool 22 that laser beam 16 has already melted. This re-melts, or slows down solidification of, portions of melt pool 22. Slowing down the solidification process reduces thermal contraction of melt pool 22 and reduces the risk of crack formation in component 28.

The powdered build material has a cooling rate that determines how quickly melt pool 22 solidifies after melting. Exemplary powdered build materials have a cooling rate that is approximately a few hundred microseconds. In the exemplary embodiment, first scanning device 18 is configured to direct laser beam 16 in direction 58 and in direction 60 faster than the time required to solidify melt pool 22 or faster than the cooling rate of melt pool 22. That is, first scanning device 18 is configured to direct laser beam 16 from an original position along nominal laser beam path 50 to a second position along direction 58 and back to the original position before melt pool 22 has solidified. Moving laser beam 16 such that it leaves and returns to a spot faster than the cooling rate of melt pool 22 slows down the solidification process such that melt pool 22 takes longer to solidify and thermal contraction of component 28 is reduced. That is, spatial oscillation increases the speed that laser beam 16 travels across melt pool 22 such that each spot receives multiple passes with laser beam 16 to slow down the solidification, allowing the micro-structures of component 28 to properly set during the solidification process. Spatial oscillation may reduce the cooling rate in a range between and including about 60% and about 95%.

Additionally, the power level laser device 14 receives from power supply system 15 may be modulated along with the spatial oscillation. A lower power level delivered to laser device 14 results in a lower intensity laser beam 16. Conversely, a higher power level delivered to laser device 14 results in a higher intensity laser beam 16. The intensity of laser beam 16 may be modulated along with the spatial oscillation described above such that the cooling rate of melt pool 22 reduced below a predetermined threshold. Specifically, locations in melt pool 22 where laser beam 16 turns may receive more energy from laser beam 16 because laser beam 16 decelerates and accelerates during the turning process. In order to uniformly control the cooling rate of melt pool 22 and avoid overheating during turns, the intensity of laser beam 16 is synchronously modulated along with the position of laser beam 16. As such, the power level delivered to laser device 14 is also modulated along with spatial oscillation such that laser beam 16 controls the cooling rate of melt pool 22 and avoids overheating. In the exemplary embodiment, computing device 24 and controller 26 are configured to determine and control both the power delivered to laser device 14 and the spatial oscillation. As such, power modulation and spatial oscillation as described herein may be implemented on current DMLM systems 10 with little to no change in the hardware of the DMLM system 10.

Power modulation and spatial oscillation as described herein may be implemented to control the cooling rate of melt pool 22. Controlling the cooling rate of melt pool 22 includes maintaining the temperature of melt pool 22 at a constant temperature for a predetermined length of time, varying the thermal history of melt pool 22 along a pre-defined curve, and maintaining the temperature of melt pool 22 above a predetermined temperature for a predetermined length of time. The systems and methods described herein oscillating a position of the laser beam on the melt pool while simultaneously modulating the intensity of the laser beam to thermally control melt pool 22 and/or derivatives of thermal control, which includes, but is not limited, to controlling a time dependent or constant cooling rate, controlling a thermal gradient, controlling a solidification speed, controlling a time above a predetermined temperature, and controlling a melt pool size and morphology.

Figure 5:
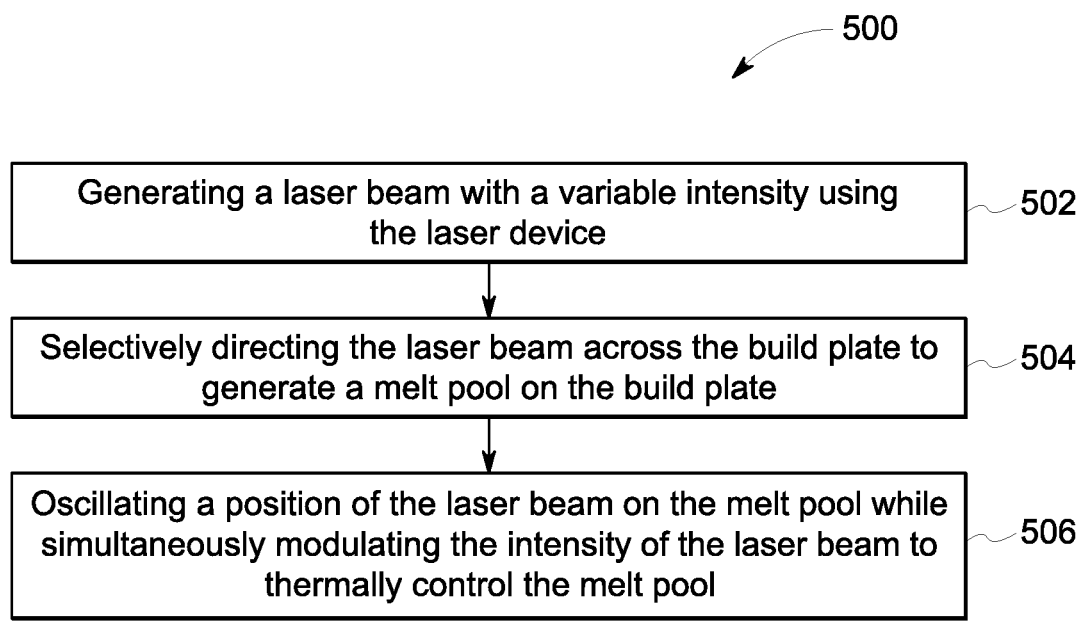
FIG. 5 is a flow diagram of a method of manufacturing a component using in the DMLM system shown in FIG. 1.

FIG. 5 is a flow diagram of a method 500 of manufacturing component 28 using DMLM system 10. Method 500 includes generating 502 laser beam 16 with a variable intensity using laser device 14. Method 500 further includes selectively directing 504 laser beam 16 across build plate 12 to generate melt pool 22 on build plate 12. Method 500 also includes oscillating 506 a position of laser beam 16 on melt pool 22 while simultaneously modulating the intensity of laser beam 16 to facilitate reducing a cooling rate of the melt pool.

Embodiments of additive manufacturing systems with dynamically shaped laser beam profiles to control microstructures in additively manufactured metals are described herein. The additive manufacturing system includes a laser device, a build plate, a power supply system, and a scanning device. The build plate has a powered build material and the laser device and the scanning device direct a laser across the powered build material to create a melt pool. The power supply system supplies a variable level of power to the laser device which varies the intensity level of the laser beam. Exemplary powdered build materials have extremely high cooling rates. As such, these powdered build materials solidify extremely quickly once the laser beam moves away from the material. Quick solidification leads to extreme thermal contraction of the metal material which may lead to cracking of the component and reduced component quality. The laser beam is spatially oscillated to reduce the cooling rate of the powdered build material and reduce the solidification time of the material. Additionally, the power level delivered to the laser device is also modulated along with spatial oscillation such that the cooling rate of the powered build material is reduced. Spatial oscillation and power modulation allows the laser beam to slow down solidification of the melt pool, reducing the risk of cracking of the component and increasing material quality.

An exemplary technical effect of the methods and systems described herein includes: (a) modulating the power level delivered to a laser device; (b) oscillating the spatial position of a laser beam; (c) decreasing the cooling rate of the powered build material; and (d) reducing cracks in an additively manufactured component.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Exemplary embodiments of additive manufacturing systems having dynamically shaped laser beam profiles for controlling micro-structures in additvely manufactured metals are described above in detail. The apparatus, systems, and methods are not limited to the specific embodiments described herein, but rather, operations of the methods and components of the systems may be utilized independently and separately from other operations or components described herein. For example, the systems, methods, and apparatus described herein may have other industrial or consumer applications and are not limited to practice with additive manufacturing systems as described herein. Rather, one or more embodiments may be implemented and utilized in connection with other industries.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An additive manufacturing system comprising:
   a laser device configured to generate a laser beam with a variable intensity;
   a build plate configured to support a powdered build material; and
   a scanning device configured to selectively direct the laser beam across the powdered build material in a first direction to generate a melt pool on said build plate, wherein said scanning device configured to oscillate a spatial position of the laser beam in at least one second direction opposite the first direction while said laser device simultaneously modulates the variable intensity of the laser beam to thermally control the melt pool.

2. The additive manufacturing system in accordance with claim 1, wherein said scanning device is configured to oscillate the spatial position of the laser beam in a third direction transverse to at least one of the first direction and the second direction and parallel to at least one of the first direction and the second direction.

3. The additive manufacturing system in accordance with claim 2, wherein said scanning device is configured to initially direct the laser beam to a first position along the first direction.

4. The additive manufacturing system in accordance with claim 3, wherein said scanning device is configured to subsequently direct the laser beam to a second position along the second direction.

5. The additive manufacturing system in accordance with claim 4, wherein said scanning device is configured to direct the laser beam from the second position back to the first position before the powdered build material located at the first position solidifies due to cooling.

6. The additive manufacturing system in accordance with claim 1, further comprising a power supply system coupled to said laser device and configured to deliver a variable level power to said laser device to vary the intensity of the laser beam.

7. The additive manufacturing system in accordance with claim 1, wherein a cooling rate of the melt pool is maintained below a predetermined threshold.

8. A method of manufacturing a component using an additive manufacturing system including a laser device, a build plate, and a scanning device, said method comprising:
   generating a laser beam with a variable intensity using the laser device;

selectively directing the laser beam in a first direction across the build plate to generate a melt pool on the build plate; and oscillating a position of the laser beam in a second direction opposite to the first direction on the melt pool while simultaneously modulating the intensity of the laser beam to thermally control the melt pool.

9. The method in accordance with claim 8, further comprising delivering a variable power level to the laser device using a power supply system.

10. The method in accordance with claim 8, wherein oscillating a position of the laser beam on the melt pool comprises oscillating the position of the laser beam using the scanning device.

11. The method in accordance with claim 8, wherein selectively directing the laser beam across the build plate to generate a melt pool on the build plate comprises selectively directing the laser beam across the build plate to generate a melt pool on the build plate using a controller.

12. An additive manufacturing system comprising:
a laser device configured to generate a laser beam with a variable intensity;
a build plate configured to support a powdered build material; and
a scanning device configured to selectively direct the laser beam across the powdered build material in a first direction to generate a melt pool on said build plate, wherein said scanning device configured to oscillate a spatial position of the laser beam in a second direction opposite to the first direction while said laser device simultaneously modulates the variable intensity of the laser beam.

13. An additive manufacturing system comprising:
an energy device configured to generate an energy beam with a variable intensity;
a build plate configured to support a build material; and
a scanning device configured to selectively direct the energy beam across the build material in a first direction to fix the build material on said build plate, wherein said scanning device configured to oscillate a spatial position of the energy beam in a second direction opposite to the first direction while said energy device simultaneously modulates the intensity of the energy beam to facilitate reducing spatter and to facilitate reducing a temperature of the build material to reduce thermal contraction of the build material.

* * * * *